April 14, 1964 J. K. STEWART 3,129,335
PHOTOSENSITIVE RAILROAD SURVEYING SYSTEM
Filed June 30, 1961
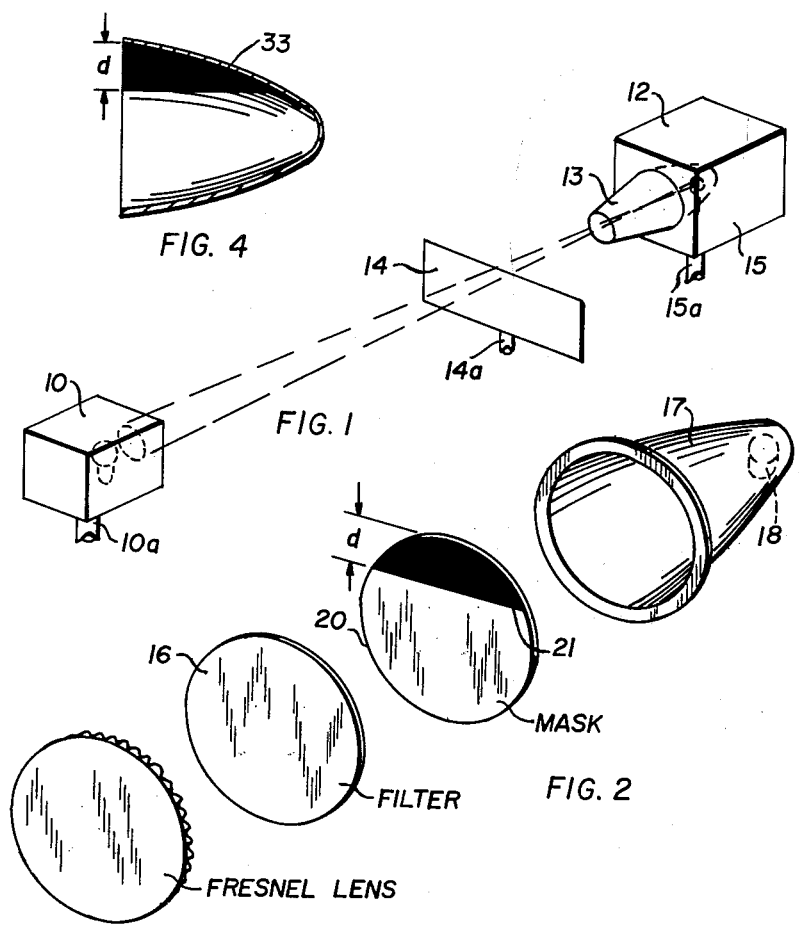
INVENTOR
JOHN K. STEWART
BY- Smart & Biggar.
ATTORNEYS 3,129,335
PHOTOSENSITIVE RAILROAD SURVEYING SYSTEM
John Kenneth Stewart, 60 Ballantyne Terrace, Dorval, Quebec, Canada
Filed June 30, 1961, Ser. No. 121,074
4 Claims. (Cl. 250—215)

This invention relates to a railroad surveying system of the type comprising a light transmitter adapted to transmit a beam of light mounted for movement along a railroad track, a light beam receiver mounted for movement along the track, shadow board means mounted for movement along the track between transmitter and receiver and adjacent the receiver for interfering with the transmitted beam, and means responsive to beam reception to indicate the condition of the track surface.

Systems of the foregoing type operate to a high degree of accuracy for track lifting operations and track surfacing operations but the accuracy is somewhat reduced in spot surfacing operations.

An example of a surveying system of the foregoing type is described in my Canada application Serial No. 822,048 filed April 25, 1961, now Canadian Patent No. 650,557.

In that system, the reception of a light beam by the receiver causes the operation of electrical means to give an indication of a discrepancy in the track, that is to say, the shadow board adjacent the light receiver drops into a low joint or sag in the rail, exposing the receiver to the transmitted beam, thereby operating means which give an indication of a track discrepancy.

Under spot surfacing conditions, the low joint or sag in the rail which causes the drop off the shadow board may be only very slightly below the desired level, say of the order of one-eighth of an inch, and the track into that sag may drop very gradually. The result is that the shadow board falls very slowly and does not give anything in the nature of a sudden increase of intensity to the light receiver. Therefore, due to this relatively slow increase in intensity, in order to ensure very high accuracy expensive, sensitive, circuitry must be associated with the receiver. This gives the desired indication of track discrepancy.

According to the present invention, applicant has overcome this drawback in existing receivers to enable them to operate with inexpensive less senstitive circuitry by locating a photoelectric cell at the focal point of a parabolic reflector and masking off between at least one-quarter and less than one-half of the upper part of the reflector when looking in the direction of the transmitted beam. When excited the photoelectric cell operates means to indicate the track discrepancy. Thus, in conditions of running on level track, the receiver, with the shadow board in its "zero" position arranged to block out approximately the lower half of the reflector from the transmitted beam, receives virtually no light at all from the relatively large transmitter and when the shadow board does drop, an increase in intensity is received suddenly.

According to a further feature of the invention, the field of reception of the transmitted light beam is restricted and with it extraneous light, by the provision of a hollow frusto-conical hood mounted on the front of the receiver with the small end of the hood arranged towards the transmitter.

The following is a description of certain embodiments of the invention, reference being had to—

FIGURE 1, which shows the general arrangement of the transmitter, receiver and shadow board, FIGURE 2, which shows the arrangement of the reflector and masking means for the receiver.

FIGURE 3, which is a diagrammatical illustration of an electric circuit operated to give an indication of track discrepancy when the light beam is received at an intensity sufficient to operate a photo-electric cell, and FIGURE 4 is a sectional elevation a parabolic mirror suitable for use in the present invention.

Referring now to the drawings, the transmitter 10 is arranged to transmit a light beam such as an infra-red light beam at a fixed frequency above the grade rail of a railroad track to be surveyed. The transmitter is mounted on a wheeled frame partially indicated at 10a, for independent movement along the track. A receiver 12 is arranged for movement along the track on a wheeled frame (partially indicated at 15a) and suitably on a tamping machine. The shadow board indicated diagrammatically at 14 is similarly mounted for movement on a wheeled frame (partially indicated at 14a) attached to the tamping device for movement therewith along the railroad track. The distances under which systems of this type operate are of the order of 150 feet between the transmitter and shadow board and 15 feet between the shadow board and receiver.

Mounted on the front of the receiver 12 and extending in the path of the beam is a hollow frusto-conical hood 13 attached by conventional means to the front of the box 15 of the receiver and extending outwardly therefrom with its small end facing the receiver. The hood is preferably black in colour on the inside so as to minimize reflections of light.

FIGURE 2 illustrates the optical system of the receiver which comprises an infra-red colour filter 16 physically located in front of the parabolic reflector 17 in the path of the transmitted light beam. A photoelectric cell 18 is arranged at the focal point of the reflector and one of two masking provisions may be made. Either a circular masking disk 20 with an opaque top segment 21 extending for a distance "d" of more than one-quarter and less than one-half of the diameter of the circle is provided, or the inside of the reflector 17 may be provided with a non-reflecting surface 23 (FIGURE 4) extending on the projected circle, when viewed in the direction of the light beam for a similar distance "d."

In operation, when the surveying system is running on level track, the shadow board 14 is adjusted at a "zero" point at a height corresponding with the approximate elevation of the photoelectric cell above the rail. Thus, although the transmitter is constantly transmitting an infra-red beam in the direction of the receiver, the bottom portion of this beam is excluded from the parabolic reflector 17 by the shadow board and whilst the top portion of the beam enters the hood 13 it is not reflected to the photoelectric cell since one or the other of the masking arrangements outlined above, either prohibits the transmission to, or the reflection from the surface of the reflector to the photoelectric cell.

When the shadow board, being in front of the receiver 12, reaches a low point in the rail before the receiver 12, it drops into the low point. Now, from receiving practically no light intensity, the photoelectric cell receives a considerably greater amount of light after the fashion of a "shock wave" and thus the gain on the amplifier 24 is very great and causes a sudden output signal from the amplifier 24 to give an indication of a discrepancy in the track by causing the lamp 25 to be lighted.

It will be clear that if it were not for the masking provisions, the photoelectric cell would constantly be receiving a certain amount of light under perfect track conditions although not sufficient light intensity to cause the amplifier to be energized. Thus, when the shadow board reaches a low point in the rail, there would be an increase in the light intensity received by the photoelectric cell but the percentage increase would be far lower than that received when masking provisions are made. By this invention it is, accordingly, possible to utilize an economical electric circuit and to avoid the necessity to provide very high gain amplifiers and like electronic components of a highly sensitive nature.

What I claim as my invention is:

1. A system for railroad surveying, comprising a light transmitter adapted to transmit a beam of light, mounted for movement along a railroad track, a light beam receiver mounted for movement along the track, shadow board means mounted for movement along the track between transmitter and receiver and adjacent the receiver, means responsive to beam reception to indicate the condition of the track surface, said light beam receiver including a parabolic reflector oriented to receive the transmitted light beam, a photoelectric cell located at the focal point of the reflector, masking means to mask off between at least one-quarter and less than one-half of the upper part of the reflector when looking in the direction of the transmitted beam and a light filter in the path of the beam in front of the reflector.

2. A system as claimed in claim 1 in which the receiver further includes a hollow frusto-conical hood located in front of said filter and adapted to pass a portion of the light beam to the receiver, the small end of the hood being arranged towards the transmitter.

3. A system as claimed in claim 1 in which the masking means comprises a circular disk arranged in front of the parabolic reflector in the path of the light beam and being opaque for a segment of the top of the circle, when viewed in the direction of the light beam, over a distance between at least one-quarter and less than one-half of the diameter of the circle.

4. A system as claimed in claim 1 in which the masking means comprises an opaque area extending over the inside of the top surface of the parabolic reflector when viewed in the direction of the light beam for a segment of the circle so presented extending downwardly from the top of the parabola for a distance of more than one-quarter of the diameter of that circle and less than one-half of said diameter.

References Cited in the file of this patent

UNITED STATES PATENTS

| 2,564,461 | Bowers | Aug. 14, 1951 |
| 2,789,260 | Curtis et al. | Apr. 16, 1957 |
| 2,884,564 | McIlvaine | Apr. 28, 1959 |
| 2,974,607 | Talboys | Mar. 14, 1961 |
| 2,984,747 | Walker | May 16, 1961 |

FOREIGN PATENTS

| 650,557 | Canada | Oct. 16, 1962 |